United States Patent [19]

Judd et al.

[11] Patent Number: 5,361,637
[45] Date of Patent: Nov. 8, 1994

[54] TEMPERATURE COMPENSATION CIRCUITRY EMPLOYING A SINGLE TEMPERATURE COMPENSATION ELEMENT

[75] Inventors: Daniel R. Judd, Burlington; Robert F. McLoughlin, North Andover, both of Mass.

[73] Assignee: MKS Instruments, Inc., Andover, Mass.

[21] Appl. No.: 973,161

[22] Filed: Nov. 6, 1992

[51] Int. Cl.⁵ .............................................. G01B 5/30
[52] U.S. Cl. ...................................................... 73/766
[58] Field of Search ................... 73/766, 862.623, 708, 73/861.02, 861.03

[56] References Cited

U.S. PATENT DOCUMENTS 4,464,932  8/1984  Ewing et al.
5,048,343  9/1991  Oboodi et al. .................. 73/862.623

*Primary Examiner*—Robert Raevis
*Attorney, Agent, or Firm*—Lappin & Kusmer

[57] ABSTRACT

Temperature compensation circuitry employing a single temperature compensation element is disclosed. By use of a single temperature compensation element, the effects of temperature on both zero offset and signal gain of a sensor may be adjusted. In addition, the circuit provides the unique capability of employing a single temperature compensation element while permitting for the independent adjustment of compensation of zero offset and signal gain.

17 Claims, 3 Drawing Sheets

TEMPERATURE COMPENSATION CIRCUITRY EMPLOYING A SINGLE TEMPERATURE COMPENSATION ELEMENT

This invention relates, generally to the field of temperature compensation circuitry, and more particularly, to an improved temperature compensation circuit employing a single temperature compensation element which is used to compensate for the effects of temperature on both the signal gain and offset of a sensor.

BACKGROUND OF THE INVENTION

In the fields of process parameter measurement and process control, it is frequently desirable to employ and/or locate sensors at stages or steps of a processing chain for the purpose of measuring process variables at that particular stage or step. Many different types of sensors may be utilized to measure many different process control variables such as temperature and pressure. Some examples of common sensors include strain sensors for measuring torque and pressure, and mass flow controllers which are used to measure and control the flow of gas through a tube. In the electronics industry, such mass flow controllers are often used in the fields of semiconductor processing and fabrication where it is necessary to accurately and precisely measure the temperature and pressure of a gas or other chemical agent at individual points in the processing path. An example of a sensor used with a mass flow controller can be found in U.S. Pat. No. 4,464,932 issued to MKS Instruments, Inc. of Andover, Mass., the present assignee. This patent illustrates an improved mass flow controller which incorporates a number of sensors for measuring the temperature and flow of a gas.

While such measurement techniques are well known, it is also well known that ambient temperature may affect the sensitivity and gain of such sensors, and may further superimpose an undesirable offset on the output of such sensors. Therefore, when designing electronic circuitry that is used to interface a sensor for the purpose of measuring some physical parameter with that sensor, it has been a common practice to correct for the effects of temperature on the sensor, or the effects of temperature on the associated sensor circuitry, by adding elements with known repeatable temperature coefficients in such a way as to null the thermal effects on the sensor and its circuitry.

An example of this practice has been to include in the sensor signal output path a temperature compensation element such as a resistor with known and repeatable temperature coefficients (like a thermistor), incorporated in such a way as to change the gain of the circuit, or the gain of the output of the sensor due to changes in ambient temperature, in a direction equal and opposite to those changes due to temperature. This frequently requires mounting the temperature compensation element in such a manner as to insure good thermal conductivity to the sensor. It is also a common practice, often employed in conjunction with the above-known gain compensation circuitry, to mount a second temperature compensation element in a similar manner and wired in a similar way such that the second temperature compensation element will counterbalance the change to any offset (including zero offset) of the sensor circuitry which also occurs as a result of changing temperature.

The prime deficiency in the above-noted circuit topology is that two temperature compensation elements must be used, and matched, and then mounted in such a way that they receive similar temperature information in order to provide compensation to the output of the sensor in a coordinated manner, increasing circuit design time and cost and decreasing operating flexibility. Accordingly, it has been determined that the need exists for a circuit design which allows for a single temperature compensation element to compensate for the undesirable thermal effects imposed on both the offset and signal gain of a sensor and its associated circuitry. Such a single temperature compensation element embodiment may, therefore, offer improved temperature compensation with reduced circuit complexity and production costs.

OBJECTS OF THE PRESENT INVENTION

It is, therefore, an object of the invention to provide an improved electronic circuit for applying temperature compensation to the output of a sensor.

It is an additional object of the invention to provide an improved temperature compensation circuit in which a single temperature compensation element may be used to compensate for the effects of temperature on both the offset and signal gain of the sensor.

It is a further object of the invention to provide an improved temperature compensation circuit which can be manufactured at a lower cost than circuits employing two or more temperature compensation elements.

It is still another object of the invention to provide an improved temperature compensation circuit which reduces compensation circuitry complexity and is easy to manufacture and assemble.

Another object of the invention is to provide a single resistive device having a predictable and repeatable temperature/resistance coefficient function for hulling the temperature effects on gain and offset of a sensing circuit, while allowing the offset and gain to be independently set.

Still other objects and advantages of the invention will, in part, be obvious and will, in part, be apparent from the specification.

Other objects of the invention will in part be obvious and will in part appear hereafter. The invention accordingly comprises the apparatus possessing the construction, combination of elements, and arrangement of parts which are exemplified in the following detailed disclosure, and the scope of the application of which will be indicated in the claims.

SUMMARY OF THE INVENTION

Generally speaking, in accordance with the present invention, an improved temperature compensation circuit employing a single temperature compensation element is provided. The improved circuit provides a means by which a single temperature compensation element may be used to compensate for the effects of temperature on both the offset and signal gain of a sensor and its output circuitry. In addition, the improved circuit provides a mechanism to apply different amounts of compensation to each of the offset and signal gain components and allows for adjusting each of such compensation components independently so that the gain and offset can each be independently set as desired.

In a preferred configuration, the temperature compensation circuitry of the present invention employs a single resistor with a known repeatable temperature/resistance coefficient, which is configured to carry both an offset and signal (or gain) current. This temperature compensation element is then mounted in such a way as to sense the temperature of the sensor or circuit components for which compensation is provided. The mounting can also be modified to sense and correct for thermal effects of the circuitry itself.

The temperature compensation element may be wired as one element of a voltage attenuator when the gain is set below unity. Alternatively, the temperature compensation element may be wired as one element of a gain amplifier when the gain is at unity or above. One or more gain stages may then be cascaded in order to achieve the desired overall circuit gain.

In addition to providing compensation for signal gain, in order to further compensate for undesirable temperature related offset, the compensating element, preferably in the form of a fixed (or adjustable) resistor is used to couple a fixed (or preset) voltage reference or fixed (or preset) current reference to the output node of the voltage attenuator circuit or, alternately, summing junction of the gain amplifier, so as to provide for a predetermined offset which also varies with temperature. However, any changes in the offset due to the temperature variations will be canceled by equal and opposite changes created by the compensating element.

Accordingly, a single element temperature compensation circuit employing a single temperature compensation element may be provided to correct for the effects of temperature on both offset and signal gain.

BRIEF DESCRIPTION OF THE DRAWINGS

For a fuller understanding of the invention, reference is had to the following descriptions taken in connection with the accompanying drawings, in which.

DETAILED DESCRIPTION OF THE PREFERRED EMBODIMENT

Figure 1:
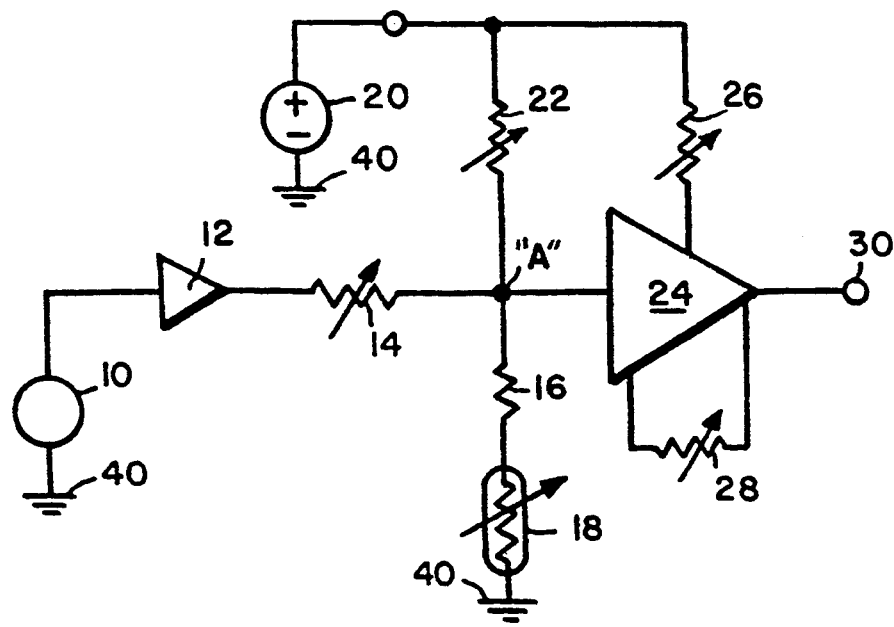
FIG. 1 is a schematic representation of one embodiment of a circuit embodying temperature compensation circuitry employing a single temperature compensation element in accordance with the present invention.

Referring first to FIG. 1, a schematic representation of a circuit employing the single element temperature compensation means constructed in accordance with the instant invention is shown. In construction, a sensor, generally referred to as 10 is provided and is the sensor whose output will be temperature compensated. As shown, sensor 10 is connected to ground 40 and to a sensor buffer amplifier 12. The purpose of sensor buffer amplifier 12 is simply to provide a fixed, low impedance drive to interface the output of sensor 10 to the rest of the circuit. The output of sensor buffer amplifier 12 is then coupled to a first sensor adjustment resistor 14.

First sensor adjustment resistor 14 is shown as being a variable resistor. However, this resistance can be made up of a single resistor having either a fixed or variable value, or a network of resistors in a series or parallel configuration. The terminal of first sensor adjustment resistor 14 which is not connected to the output of sensor buffer amplifier 12 acts as a summing junction "A", to which a second sensor adjustment resistor 16 is attached. Once again, although second sensor adjustment resistor 16 is shown as having a fixed value, second sensor adjustment resistor 16 could, of course, be substituted with an adjustable resistive element. Finally, the terminal of the second sensor adjustment resistor 16 which is not connected to summing junction "A" is connected to temperature compensation element 18, which is itself grounded to ground 40. Temperature compensation element 18 can, in practice, be any element that has a predictable and repeatable temperature(/impedance) coefficient, i.e., an element whose impedance changes with temperature, such as a resistor, thermistor, transistor, diode or a resistance thermal detector (RTD). In practice, the temperature compensation element 18 provided has a temperature coefficient which provides a net contribution to the entire circuit so as to provide the appropriate compensation so as to null the effects of temperature on sensor 10. In this way, the combination of elements comprising sensor 10, sensor buffer amplifier 12, first sensor adjustment resistor 14, second sensor adjustment resistor 16 and temperature compensation element 18 provides a signal attenuator circuit which attenuates the signal appearing between summing junction "A" and ground 40.

Figure 3:
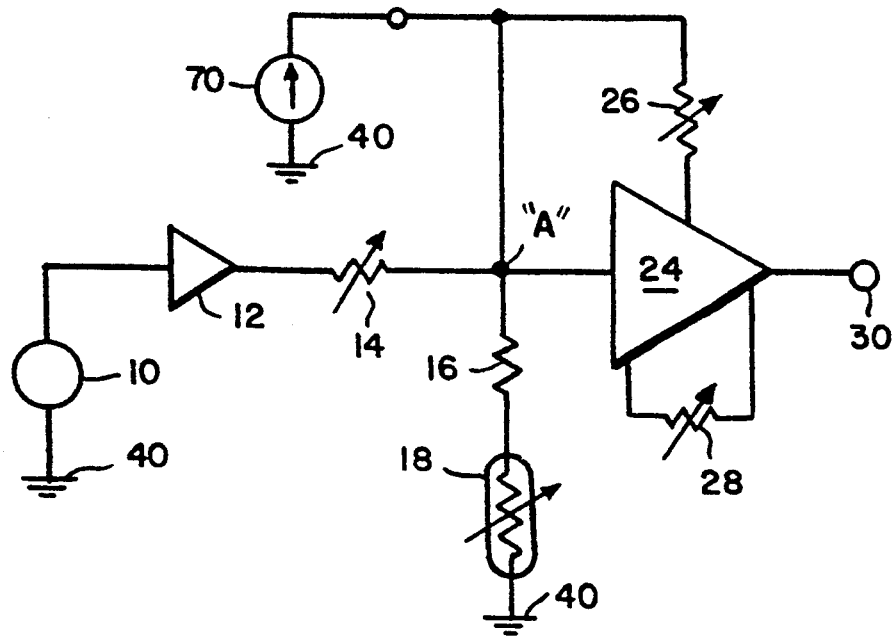
FIG. 3 is a schematic representation showing a modification to the FIG. 1 embodiment.

Turning next to the portion of the circuit which provides the offset function, a fixed voltage reference 20 provides a constant potential between one of its output terminals and ground 40. In FIG. 1 the voltage reference 20 provides a positive voltage so that the negative output is connected to ground. A voltage reference adjustment resistor 22 is then connected between the positive voltage output terminal of voltage reference 20 and summing junction "A". Alternatively, a negative voltage can be provided by connecting the positive output of the reference 20 to ground and the negative voltage output terminal to resistor 22. Thereafter, by adjusting the value of voltage reference adjustment resistor 22, the voltage which appears across voltage reference adjustment resistor 22 in relation to the voltage which appears across the combination of circuit elements comprising voltage reference adjustment resistor 22, second sensor adjustment resistor 16 and temperature compensation element 18 may be adjusted to vary the temperature dependent offset provided at summing junction "A". This arrangement further provides a means by which temperature compensation element 18 is the temperature variable resistor in both the offset circuit made up of voltage reference 20, voltage reference adjustment resistor 22, second sensor adjustment resistor 16 and temperature compensation element 18 as well as the aforenoted signal attenuator loop. In this way, temperature compensation element 18 serves a dual role in providing temperature compensation for both gain and offset while first sensor adjustment resistor 14 provides for variable adjustment to the gain of sensor 10 while voltage reference adjustment resistor 22 provides for a variable adjustment of the bias current applied to summing junction "A", both of these adjustments being controllable independently. Alternatively, as shown in FIG. 3, a current source 70 can be substituted for the voltage reference 20 so that the output of the source 70 is resistor 22 and connected to junction A so as to provide a fixed current to the junction.

Completing the description of the circuit illustrated in FIG. 1, the output of summing junction "A" is then provided as an input to an output amplifier 24. This output amplifier may be realized by using an operational amplifier or any other suitable amplifier construction. Output amplifier 24 is connected to an output amplifier offset control resistor 26, which is itself directly connected to voltage reference 20. Output amplifier offset control resistor 26 is then adjusted such that at a base or ambient temperature the offset current provided by voltage reference 20 into output amplifier 24 may be nulled.

Additionally, output amplifier 24 also utilizes an output amplifier gain control resistor 28 which is arranged in a well known feedback configuration to adjust the gain of output amplifier 24, the output of which is provided to circuit output 30. The details of sensor buffer amplifier 12 and output amplifier 24 are not described here since many configurations for these functional circuit blocks are well known operational amplifier circuits and, therefore, may be easily altered according to the characteristics of the sensor 10 and the desired circuit output 30.

In operation, second sensor adjustment resistor 16 may be selected to yield a desirable resistance versus temperature function for one leg of the attenuator circuit. The selection of the value of second sensor adjustment resistor 16 may be made through calculations or by the result of empirical testing. First sensor adjustment resistor 14 is then adjusted to yield a straight line gain versus temperature response. These adjustments provide for temperature compensation of the gain from the output of sensor 10 appearing at summing junction "A". Thereafter, voltage reference adjustment resistor 22 may be adjusted to null any changes in the offset of the output of sensor 10 due to changes in temperature. Finally, output amplifier offset control resistor 26 and output amplifier gain control resistor 28 may each be adjusted to yield the desired overall offset and gain of the circuit. Therefore, by using the above-described configuration, as illustrated in FIG. 1, the construction and operation of temperature control circuitry employing a single temperature compensation element, in accordance with the instant invention, may be easily understood.

Figure 4:
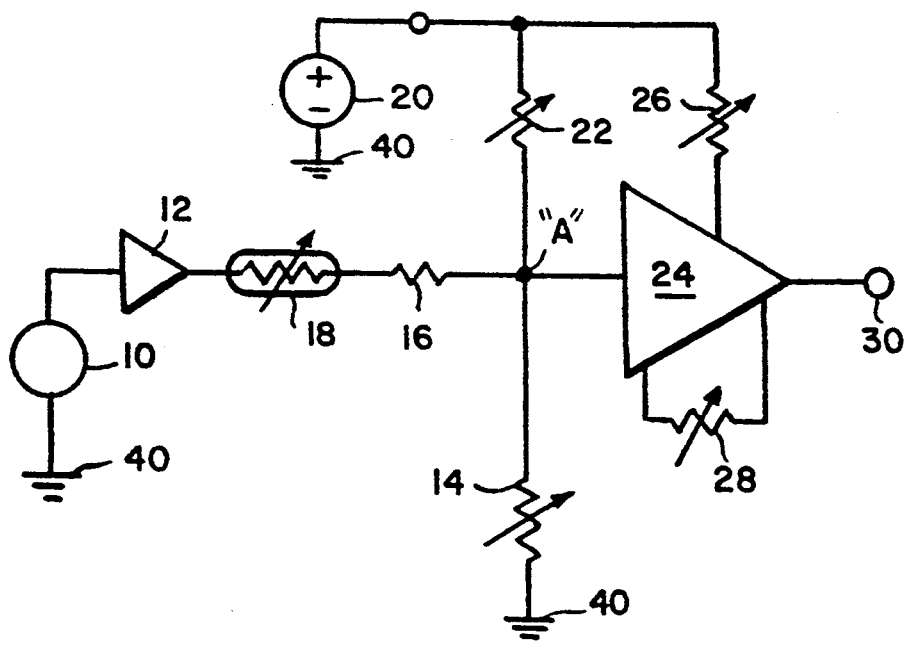
FIG. 4 is a schematic representation showing another modification to the FIG. 1 embodiment.

It should be appreciated that, as shown in FIG. 4, the temperature compensating element 18 and the second sensor adjustment resistor 16 can be switched with the first sensor adjustment resistor 14, i.e., elements 16 and 18 connected in series between the output of amplifier 12 and junction "A" and the resistor 14 connected between junction A and ground, with the same compensating results.

Figure 2:
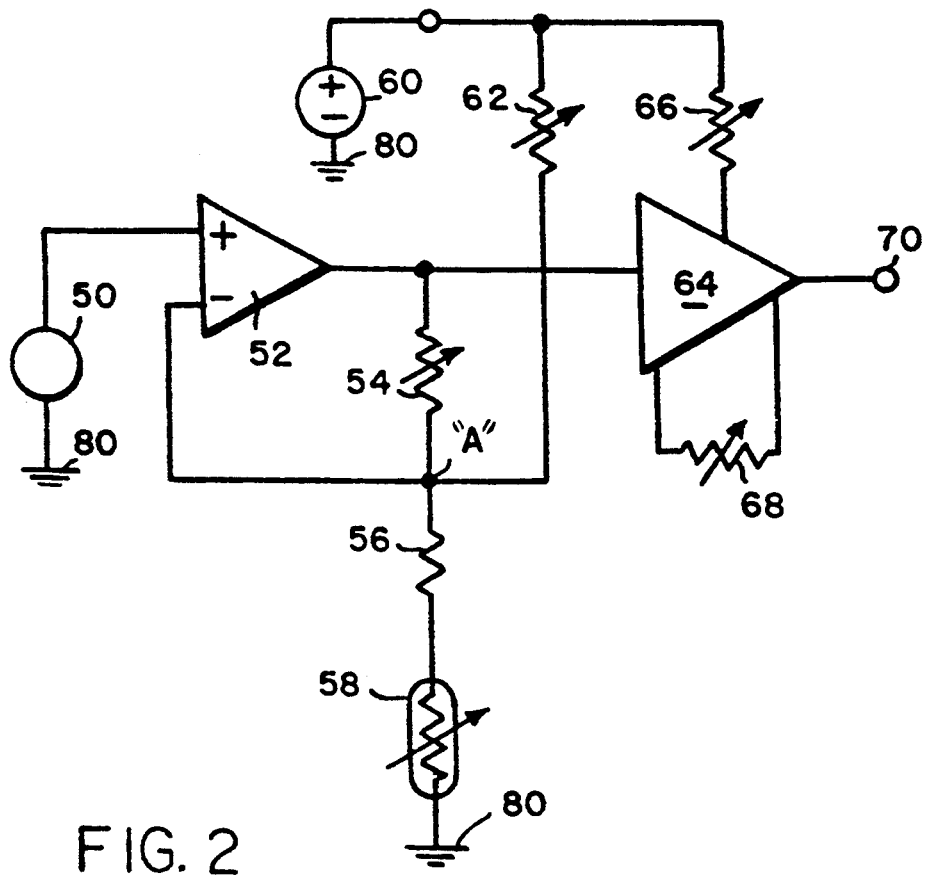
FIG. 2 is a schematic representation of an alternate embodiment of a circuit constructed in accordance with the instant invention providing a temperature compensation circuit employing a single temperature compensation element.

Referring next to FIG. 2 an alternate embodiment of temperature compensation circuitry employing a single temperature compensation element constructed in accordance with the teachings of the instant invention is shown. The construction of the embodiment illustrated in FIG. 2 is quite similar to that of the embodiment illustrated in FIG. 1 except that sensor buffer amplifier 12 is replaced with a sensor amplifier 52 which provides controllable gain from the output of the sensor into the summing junction A'.

Described in greater detail, in FIG. 2, a sensor 50 is connected between ground 80 and the positive input to sensor amplifier 52. The output of sensor amplifier 52 is then connected to sensor amplifier gain control resistor 54, the latter being adjustable to provide a controllable amount of negative feedback to the negative input of sensor amplifier 52. A sensor adjustment resistor 56 is then connected to summing junction A' and to a temperature compensation element 58 which is connected to ground 80. In a manner very similar to the configuration described above, the elements comprising sensor 50, sensor amplifier 52, sensor adjustment resistor 56 and temperature compensation element 58 comprise a temperature compensation gain loop which may be adjusted to compensate for any variation in the output of sensor 50 when measured between summing junction A' and ground 80.

Figure 5:
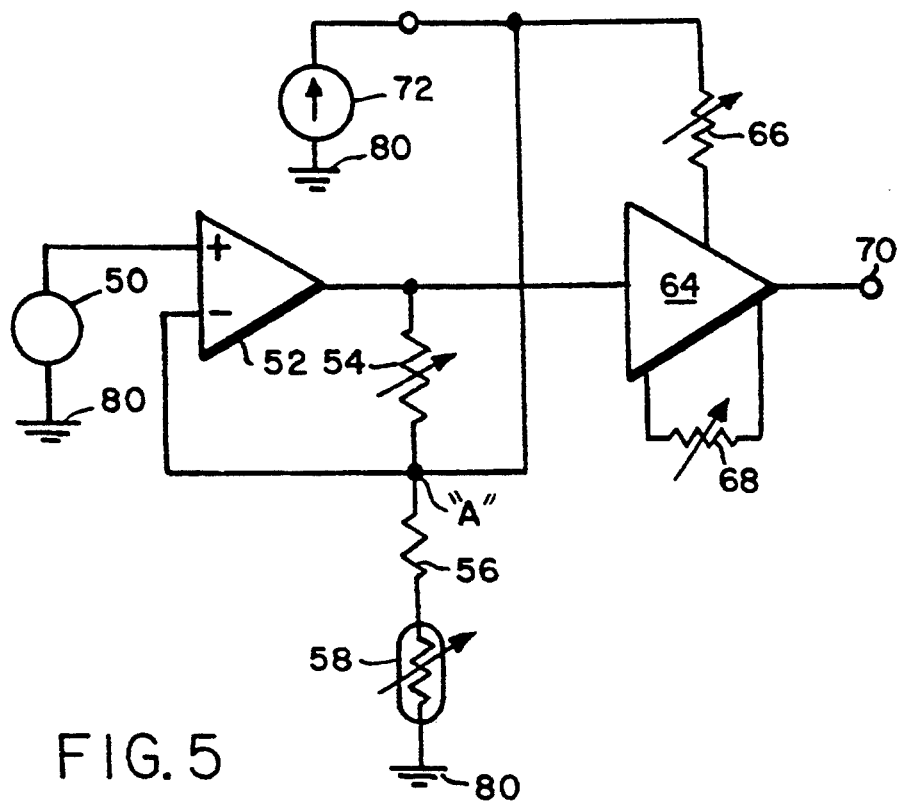
FIG. 5 is a schematic representation showing a modification to the FIG. 2 embodiment.

With respect to control of the offset, once again a voltage reference 60 is provided with respect to ground 80, the output of which is supplied to a voltage reference adjustment resistor 62. One terminal of the voltage sensor adjustment resistor 62 connects to the output of voltage reference 60, and the other terminal of voltage reference adjustment resistor 62 connects to summing junction A'. Therefore, the combination of voltage reference 60, voltage reference adjustment resistor 62, sensor adjustment resistor 56, temperature compensation element 58 may be used to provide a voltage offset to summing junction A' in a relationship of a voltage divider through voltage reference adjustment resistor 62, sensor adjustment resistor 56, temperature compensation element 58 and gain control resistor 54. This in turn provides both temperature compensation of gain and offset to summing junction A'. As in FIG. 1, as best seen in FIG. 5, a current source 72 can be substituted for voltage source 60 and resistor 62 so as to provide a constant current to junction A'.

Completing the circuit once again, an output amplifier 64 is provided which has an output amplifier offset control resistor 66 cooperative with voltage reference 60 for providing an offset to output amplifier 64 at a nominal ambient temperature. Additionally, output amplifier 64 employs an output amplifier gain control resistor 68 which is arranged as a feedback resistor to control the gain of output amplifier 64, and thus the magnitude of the output signal provided to circuit output 70. Therefore, by using such a modified configuration, temperature amplifier 52 may be configured with its associated components to provide a gain stage into summing junction A' as opposed to an attenuation stage as illustrated in FIG. 1.

Figure 6:
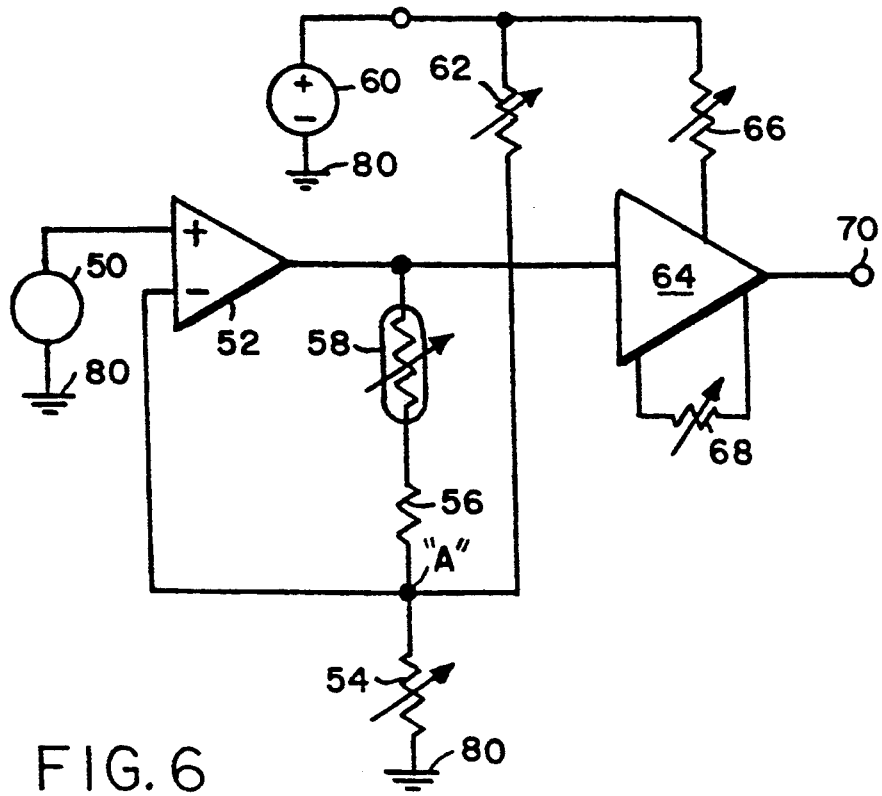
FIG. 6 is a schematic representation showing another modification to the FIG. 2 embodiment.

As in the case of FIG. 1, alternatively, as best seen in FIG. 6 adjustment resistor 56 and temperature compensation element 58 of FIG. 2 can be switched with amplifier gain control resistor 54 so as to provide a temperature coefficient opposite in sign, but nevertheless provide null compensation.

Although the temperature compensation circuitry of the instant invention has been described in detail with the respect to FIGS. 1-6 above, the invention is not limited to the above-noted circuit topologies. Rather, a number of alternative configurations may be employed.

Therefore, by incorporating the circuits described herein, a mechanism for providing a temperature compensation scheme which corrects for the undesirable thermal effects on a sensor may be provided. As noted, the invention is unique in that it utilizes a single temperature sensing component in such a way as to correct for both the offset and signal gain errors of a sensor due to temperature. By incorporating the circuit topology of the instant invention, a compensation circuit which is simple to build and realizable with relative few components may be obtained.

Additionally, an advantage of the current invention is that, as shown in each of the embodiments, one terminal of the temperature compensation element is connected to ground. This is an advantageous implementation in that it may be easily wired in such a way so as to prevent circuit noise. This is because the low impedance nature of the circuit ground is not as susceptible to electrical and electromagnetic interference as higher impedance circuit nodes.

Another advantage of these grounded topologies is realized in that by using the teachings of the instant invention it is not required that either temperature compensation element 18 or temperature compensation element 58 be driven directly from the output of an amplifier. This is an advantage because the nature of the temperature compensation element often requires mounting it remotely from the circuit board to which it interfaces. In practice, as the interconnecting cable between the temperature compensation element and circuit board increases in length, the possibility of oscillations due to cable capacitance on the output of the amplifier becomes a concern. Therefore, by grounding one terminal of the temperature compensation element, such oscillations may be reduced or even eliminated.

On the other hand, it is noted that in applications where a good electrical circuit ground may be available near the sensor, the temperature compensation element may then be connected to the circuit simply through the use of only a single wire. In such an implementation, the other end of the temperature compensation element may be connected directly to the sensor ground which would also provide for a good thermal connection between the sensor and the temperature compensation element. Therefore, by incorporating circuitry in accordance with the above description an inexpensive and simple means of correcting for the thermal effects on both the offset and gain of a sensor intended to electrically measure some physical parameter may be realized while maintaining the flexibility of allowing for achieving independent amounts of compensation for each of the gain and offset components and for further adjusting them independently.

Since certain changes may be made in the above apparatus, without departing from the scope of the invention herein involved, it is therefor intended that all matter contained in the above description or shown in the accompanying drawings shall be interpreted as illustrative and not in a limiting sense.

What is claimed is:

1. A compensation circuit comprising:
    sensor means for sensing a measurable physical condition and for providing an output signal as a function of the measured physical condition;
    gain control means for adjusting the amplitude of the output signal of said sensor means as a function of a predetermined gain;
    offset control means for adjusting the offset of the output signal of said sensor means as a function of a predetermined offset; and
    temperature compensation means, comprising a single temperature compensation element means, common to both said gain control means and said offset means, for adjusting both the gain of the gain control means and the offset of the offset control means in accordance with variations in the temperature of said sensor means so as to nullify the effect of temperature on said predetermined gain and the predetermined offset.

2. A compensation circuit as claimed in claim 1, wherein said gain control means comprises an adjustable gain resistor means, electrically disposed between said sensor means output and said temperature compensation means, for adjusting the gain of the output of said sensor means at a nominal temperature.

3. A compensation circuit as claimed in claim 2, wherein said offset control means comprises an adjustable offset resistor means, electrically disposed between an electrically fixed reference node and said temperature compensation means, for adjusting the offset of the output of said sensor means at a nominal temperature.

4. A compensation circuit as claimed in claim 3, wherein said offset control means further comprises a fixed reference voltage source the output of which is applied to said electrically fixed reference node.

5. A compensation circuit as claimed in claim 3, wherein said offset control means further comprises a fixed reference current source the output of which is applied to said electrically fixed reference node.

6. A compensation circuit as claimed in claim 1, wherein said sensor means and said temperature compensation means share a common electrical ground.

7. A compensation circuit as claimed in claim 1, wherein said gain control means includes means for controlling said gain to a value of less than unity.

8. A compensation circuit as claimed in claim 1, wherein said gain control means includes means for controlling said gain to a value greater than or equal to unity.

9. A compensation circuit as claimed in claim 1, wherein said single temperature compensation element means is a device having a predictable and repeatable temperature coefficient.

10. A compensation circuit as claimed in claim 9, wherein said single temperature compensation element means is a thermistor.

11. A compensation circuit as claimed in claim 1, wherein said single temperature compensation element means is a resistor.

12. A compensation circuit as claimed in claim 1, wherein:
    said gain control means and said offset control means includes a common summing node such that a signal generated at said common summing node is responsive to changes affecting said sensor means output in response to the operation of said gain control means, said offset control means and said temperature compensation means,
    said compensation circuit further comprising output amplifier for providing a temperature compensated gain controlled offset controlled sensor signal as a function of the signal generated at said common summing node.

13. A compensation circuit as claimed in claim 12, wherein said output amplifier means includes an operational amplifier.

14. A compensation circuit as claimed in claim 12, wherein said gain control means further includes means for setting said gain to a value of less than unity.

15. A compensation circuit as claimed in claim 12, wherein said temperature compensation means is connected between the output of said sensor means and said common node.

16. A compensation circuit as claimed in claim 12, wherein said temperature compensation means is connected between said common sensing node and ground.

17. A compensation circuit as claimed in claim 1, wherein said gain control means further comprises an adjustable gain resistor means for adjusting the gain of the output of said sensor means at a nominal temperature, and said temperature compensation means is disposed between said adjustable gain resistor means and said sensor means output.

* * * * *